US012561324B2

(12) United States Patent
Posner et al.

(10) Patent No.: US 12,561,324 B2
(45) Date of Patent: Feb. 24, 2026

(54) DYNAMIC PERFORMANCE TUNING BASED ON IMPLIED DATA CHARACTERISTICS

(71) Applicant: Oracle International Corporation, Redwood Shores, CA (US)

(72) Inventors: Joseph Marc Posner, Oakland, CA (US); Sunil Kumar Kunisetty, Fremont, CA (US); Mohan Kamath, Fremont, CA (US); Nickolas Kavantzas, Emerald Hills, CA (US); Sachin Bhatkar, Sunnyvale, CA (US); Sergey Troshin, Santa Clara, CA (US); Sujay Sarkhel, San Jose, CA (US); Shivakumar Subramanian Govindarajapuram, Dublin, CA (US); Vijayalakshmi Krishnamurthy, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/949,827

(22) Filed: Nov. 15, 2024

(65) Prior Publication Data

US 2025/0077518 A1    Mar. 6, 2025

Related U.S. Application Data

(63) Continuation of application No. 18/149,576, filed on Jan. 3, 2023, now Pat. No. 12,182,123, which is a
(Continued)

(51) Int. Cl.
*G06F 16/00*      (2019.01)
*G06F 11/34*      (2006.01)
(Continued)

(52) U.S. Cl.
CPC .... *G06F 16/24544* (2019.01); *G06F 11/3409* (2013.01); *G06F 16/213* (2019.01);
(Continued)

(58) Field of Classification Search
CPC ............. G06F 16/24544; G06F 16/285; G06F 16/2282; G06F 16/2228; G06F 16/213;
(Continued)

(56) References Cited

U.S. PATENT DOCUMENTS 10,061,816 B2 *   8/2018  Convertino ....... G06F 16/24573
10,607,150 B2 *   3/2020  Sainani ................... H04L 41/16
(Continued)

FOREIGN PATENT DOCUMENTS

CN       1828556 A      9/2006
CN     108021338 A      5/2018
(Continued)

OTHER PUBLICATIONS

Zhi Qiao et al., "Modelling semantics across multiple time series and its applications, Knowledge-Based Systems", vol. 85, Sep. 2015, pp. 27-36.*
(Continued)

*Primary Examiner* — Srirama Channavajjala
(74) *Attorney, Agent, or Firm* — Invoke

(57)                    ABSTRACT

Techniques for improving system performance based on data characteristics are disclosed. A system may receive updates to a first data set at a first frequency. The system selects a first storage configuration, from a plurality of storage configurations, for storing the first data set based on the first frequency, and stores the first data set in accordance with the first storage configuration. The system may further receive updates to a second data set at a second frequency. The system selects a second storage configuration, from the plurality of storage configurations, for storing the second
(Continued)

data set based on the second frequency, and stores the second data set in accordance with the second storage configuration. The second storage configuration is different than the first storage configuration.

18 Claims, 5 Drawing Sheets

Related U.S. Application Data continuation of application No. 16/992,819, filed on Aug. 13, 2020, now Pat. No. 11,573,962, which is a continuation-in-part of application No. 16/438,969, filed on Jun. 12, 2019, now Pat. No. 11,568,179.

(60) Provisional application No. 62/748,374, filed on Oct. 19, 2018.

(51) Int. Cl.

| | |
|---|---|
| *G06F 16/21* | (2019.01) |
| *G06F 16/22* | (2019.01) |
| *G06F 16/23* | (2019.01) |
| *G06F 16/242* | (2019.01) |
| *G06F 16/2453* | (2019.01) |
| *G06F 16/28* | (2019.01) |
| *G06N 3/08* | (2023.01) |
| *G06N 3/088* | (2023.01) |
| *G06N 5/025* | (2023.01) |
| *G06N 5/04* | (2023.01) |
| *G06N 20/00* | (2019.01) |
| *G06N 20/10* | (2019.01) |
| *G06N 20/20* | (2019.01) |

(52) U.S. Cl.
CPC ...... *G06F 16/2228* (2019.01); *G06F 16/2282* (2019.01); *G06F 16/2358* (2019.01); *G06F 16/2425* (2019.01); *G06F 16/285* (2019.01); *G06N 3/08* (2013.01); *G06N 3/088* (2013.01); *G06N 5/025* (2013.01); *G06N 5/04* (2013.01); *G06N 20/10* (2019.01); *G06N 20/20* (2019.01)

(58) Field of Classification Search
CPC ............. G06F 16/2358; G06F 16/2425; G06F 11/3409; G06N 20/00; G06N 20/10; G06N 3/08; G06N 3/048; G06N 3/045; G06N 3/044; G06N 3/0632; G06N 3/0604; G06N 3/0682; G06N 3/0659; G06N 3/061; G06N 5/025; G06N 5/04
See application file for complete search history.

(56) References Cited

U.S. PATENT DOCUMENTS

| | | | |
|---|---|---|---|
| 10,671,355 B2 * | 6/2020 | Banuelos | .................. G06F 8/35 |
| 2007/0106666 A1 * | 5/2007 | Beckerle | ................ G06F 16/27 |
| 2015/0254555 A1 * | 9/2015 | Williams, Jr. | ......... G06N 3/045 |
| | | | 706/14 |
| 2016/0253340 A1 * | 9/2016 | Barth | .................... G06F 16/122 |
| | | | 707/756 |
| 2017/0061321 A1 * | 3/2017 | Maiya Belur | .... G06Q 10/06315 |
| 2017/0132520 A1 * | 5/2017 | Burroughs | ............... G06N 7/01 |
| 2018/0121492 A1 | 5/2018 | Sawhney | |
| 2018/0211182 A1 * | 7/2018 | Lei | ..................... G06V 10/7715 |
| 2018/0218282 A1 * | 8/2018 | Mathew | ................ G06N 20/00 |
| 2018/0253468 A1 | 9/2018 | Gurajada et al. | |
| 2019/0065985 A1 * | 2/2019 | Fieres | ................ G06F 11/0703 |
| 2020/0097810 A1 * | 3/2020 | Hetherington | ......... G06N 20/20 |

FOREIGN PATENT DOCUMENTS

| | | | | |
|---|---|---|---|---|
| GB | 2633833 A | * | 3/2025 | |
| WO | WO2018009474 A1 | * | 1/2018 | |
| WO | WO2018187361 A1 | * | 10/2018 | |

OTHER PUBLICATIONS

Lin Lin et al., "Random forests-based extreme learning machine ensemble for multi-regime time series prediction", Expert Systems with Applications , vol. 83, Oct. 15, 2017, pp. 164-176.*

* cited by examiner

System 100

| Device Identifier | Device Mode | Temperature | Timestamp |
|---|---|---|---|
| Device_01 | Cooling | 68.2 | 11:59:55 |
| Device_01 | Cooling | 68.0 | 11:59:56 |
| Device_01 | Cooling | 67.9 | 11:59:57 |
| Device_01 | Cooling | 67.7 | 11:59:58 |
| Device_01 | Cooling | 67.5 | 11:59:59 |
| Device_01 | Heating | 67.5 | 12:00:00 |
| Device_01 | Heating | 67.6 | 12:00:01 |
| Device_01 | Heating | 67.7 | 12:00:02 |
| Device_01 | Heating | 67.9 | 12:00:03 |
| Device_01 | Heating | 68.1 | 12:00:04 |
| Device_01 | Heating | 68.3 | 12:00:05 |

FIG. 3B

DYNAMIC PERFORMANCE TUNING BASED ON IMPLIED DATA CHARACTERISTICS

INCORPORATION BY REFERENCE; DISCLAIMER

Each of the following applications are hereby incorporated by reference: application Ser. No. 18/149,576 filed on Jan. 3, 2023; application Ser. No. 16/992,819 filed on Aug. 13, 2020; application Ser. No. 16/438,969 filed on Jun. 12, 2019; application No. 62/748,374 filed on Oct. 19, 2018. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to data analytics. In particular, the present disclosure relates to techniques for improving system performance based on data characteristics.

BACKGROUND

Internet of Things (IoT) devices produce a data set that include data of three distinct categories: Identifier Data, Usecase Data, and Runtime Data.

Identifier Data may include human-readable and/or human-understandable characteristics of a device producing the data. In particular, Identifier Data can include aspects such as device name, serial number, data of purchase, and similar characteristics. Identifier Data can include many different identifiers of a device providing the data. Typically, Identifier Data includes data that remains constant or changes very seldomly. Identifier Data will have the lowest cardinality (e.g., the fewest distinct fields or combination of fields) in the system. Usecase Data is generally data referring to the various ways a device providing data is used. For example, for a thermostat, the Usecase Data may comprise "heating" or "cooling." Like Identifier Data, Usecase Data is typically represented as one or more strings. Runtime Data may include information measured by the device as used in the field. As an example, for a thermostat Runtime Data may include a temperature measurement and a timestamp indicating a time at which the temperature was recorded. The Runtime Data is typically the largest category of data, often by orders of magnitude.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIGS. 3A and 3B illustrate an example system for improving system performance based on data characteristics.

DETAILED DESCRIPTION

Figure 1:
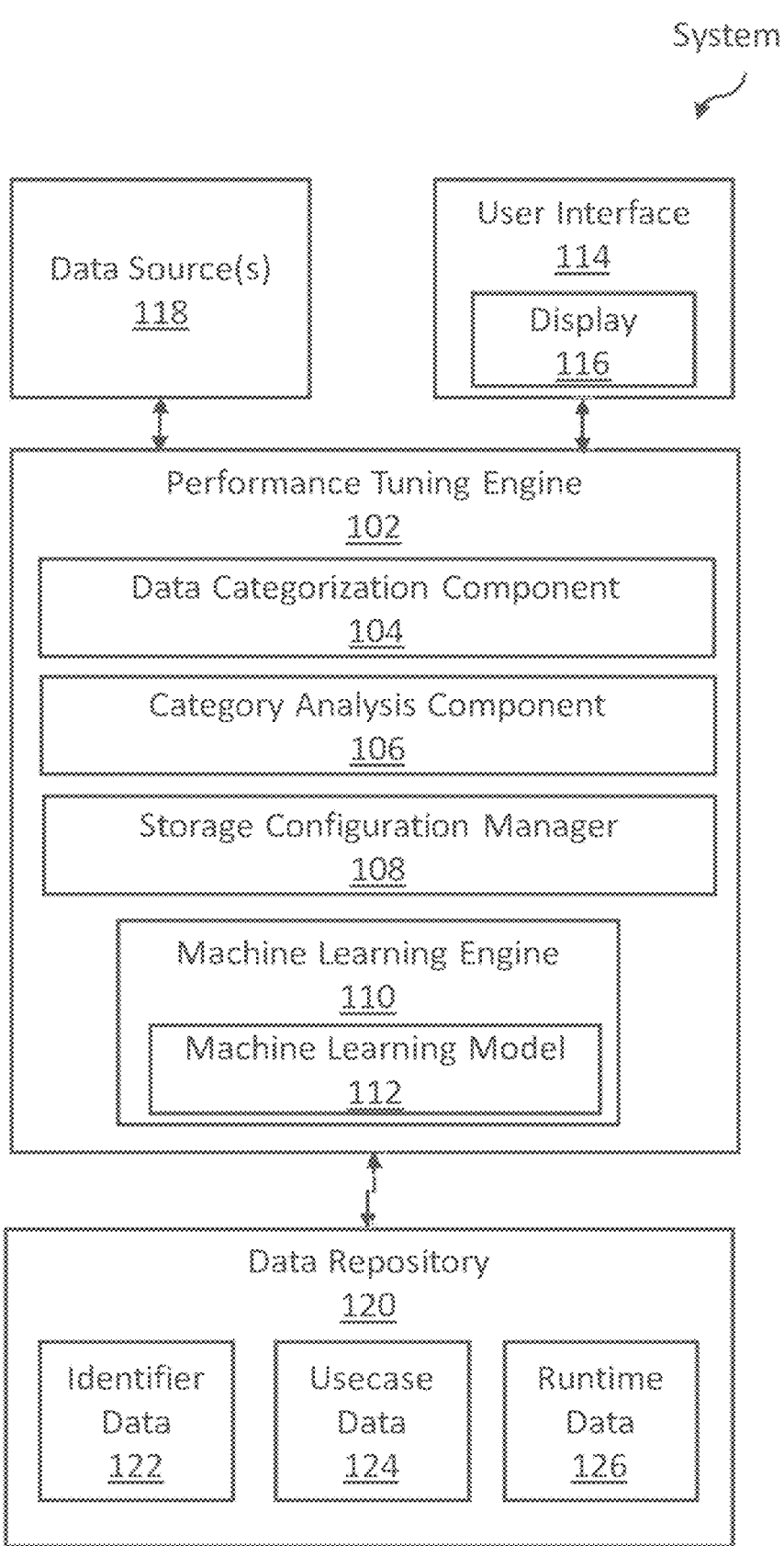
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. IMPROVING SYSTEM PERFORMANCE BASED ON DATA CHARACTERISTICS
4. EXAMPLE EMBODIMENT
5. MISCELLANEOUS; EXTENSIONS
6. HARDWARE OVERVIEW

1. General Overview

One or more embodiments include systems for performance tuning based on data characteristics. Users of big data systems may use heterogenous storage mechanisms that do not support traditional cost-based query tuning since they are backed by storage systems that do not provide commonly-used features like indexes, row counts, data cardinality statistics and similar tools, or since the heterogeneous nature of the storage systems prevent cross-storage optimization. However, with time-series based data, inherent aspects of the data, the storage patterns, and implied aspects of the data based on the query itself, can be used to deduce presumed patterns and help to optimize execution of the query. User defined metadata about how data sources are related provides insight into what kind of data is stored in each system and the metadata can be used to deduce missing statistical information about the stored data. Similarly, once some information about a particular data source is known, the characteristics of other data sources can be assumed.

In embodiments, the system may determine how to store and access data by grouping the data. For example, when processing data from one or more Internet of Things (IoT) devices, the system may group data into one of three families of data that it considers characteristic of Internet of Things data. The system may use information about what data has been grouped into each family to make assumptions about what data should be found in the other families and to adjust storage and retrieval processes accordingly.

The three families of data used for Internet of Things data can be, for example, Identifier Data, Usecase Data and Runtime Data. The system may use these families of data because they allow efficient, definable classification and because the classifications will in turn allow for estimation of use cases.

Data fields within the data set can be grouped based on characteristics of the data. In particular, data fields can be categorized based on one or more characteristics of the data stored in that field, such as cardinality (e.g., a number of entries in the data field) and/or update frequency (e.g., a frequency with which data in the field is updated).

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes a performance tuning engine 102, a user interface 114, one or more external data sources 118, a data repository 120, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the user interface 114 refers to hardware and/or software configured to facilitate communications between a user and the interface creation engine 102. The user interface 114 may be used by a user who accesses an interface (e.g., a dashboard interface) for work and/or personal activities. The user interface 114 may be associated with one or more devices for presenting visual media, such as a display 116, including a monitor, a television, a projector, and/or the like. User interface 114 renders user interface elements and receives input via user interface elements. Examples of interfaces include a graphical user interface (GUI), a command line interface (CLI), a haptic interface, and a voice command interface. Examples of user interface elements include checkboxes, radio buttons, drop-down lists, list boxes, buttons, toggles, text fields, date and time selectors, command lines, sliders, pages, and forms.

In an embodiment, different components of the user interface 114 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface 114 is specified in one or more other languages, such as Java, C, or C++.

In one or more embodiments, the performance tuning engine 102 refers to hardware and/or software configured to perform operations described herein for dynamic performance tuning based on implied data characteristics. Examples of operations for dynamic performance tuning based on implied data characteristics are described below with reference to FIG. 2.

In an embodiment, the performance tuning engine 102 includes a data categorization component 104. The data categorization component 104 may refer to hardware and/or software configured to perform operations described herein (including such operations as may be incorporated by reference) for recognizing input from a user.

In an embodiment, the performance tuning engine 102 includes a category analysis component 106. The category analysis component 106 may refer to hardware and/or software configured to perform generation and/or identification of query suggestions.

In an embodiment, the performance tuning engine 102 includes a storage configuration manager 106. The storage configuration manager 106 may refer to hardware and/or software configured to perform selection of one of the selected queries.

In an embodiment, one or more components of the performance tuning engine 102 use a machine learning engine 110. Machine learning includes various techniques in the field of artificial intelligence that deal with computer-implemented, user-independent processes for solving problems that have variable inputs.

In some embodiments, the machine learning engine 110 trains a machine learning model 112 to perform one or more operations. In particular, the machine learning engine 110 may train the machine learning model 112 to receive, as input, one or more records of a data set, divide the one or more records into one or more data fields. The one or more machine learning engine 110 may cause the machine learning model 112 to determine one or more characteristics associated with each of the data fields, and to select a storage configuration for the data field based on the one or more characteristics.

Training a machine learning model 112 uses training data to generate a function that, given one or more inputs to the machine learning model 112, computes a corresponding output. In at least some embodiments, the machine learning model 112 may include a two-step process, such that data is input to an algorithm that outputs a model and date is fed to the model to produce an output. The output may correspond to a prediction based on prior machine learning. In an embodiment, the output includes a label, classification, and/or categorization assigned to the provided input(s). The machine learning model 112 corresponds to a learned model for performing the desired operation(s) (e.g., labeling, classifying, and/or categorizing inputs). The performance tuning engine 102 may use multiple machine learning engines 110 and/or multiple machine learning models 112 for different purposes.

In an embodiment, the machine learning engine 110 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 110 receives positive and/or negative reinforcement in the process of attempting to solve a particular problem (e.g., to optimize performance in a particular scenario, according to one or more predefined performance criteria). In an embodiment, the machine learning engine 110 initially uses supervised learning to train the machine learning model 112 and then uses unsupervised learning to update the machine learning model 112 on an ongoing basis.

In an embodiment, a machine learning engine 110 may use many different techniques to label, classify, and/or categorize inputs. A machine learning engine 110 may transform inputs into feature vectors that describe one or more properties ("features") of the inputs. The machine learning engine 110 may label, classify, and/or categorize the inputs based on the feature vectors. Alternatively or additionally, a machine learning engine 110 may use clustering (also referred to as cluster analysis) to identify commonalities in the inputs. The machine learning engine 110 may group (i.e., cluster) the inputs based on those commonalities. The machine learning engine 110 may use hierarchical clustering, k-means clustering, and/or another clustering method or combination thereof. In an embodiment, a machine learning engine 110 includes an artificial neural network. An artificial neural network includes multiple nodes (also referred to as artificial neurons) and edges between nodes. Edges may be associated with corresponding weights that represent the strengths of connections between nodes, which the machine learning engine 110 adjusts as machine learning proceeds. Alternatively or additionally, a machine learning engine 110 may include a support vector machine. A support vector machine represents inputs as vectors. The machine learning engine 110 may label, classify, and/or categorizes inputs based on the vectors. Alternatively or additionally, the machine learning engine 110 may use a naïve Bayes classifier to label, classify, and/or categorize inputs. Alternatively or additionally, given a particular input, a machine learning model may apply a decision tree to predict an output for the given input. Alternatively or additionally, a machine learning engine 110 may apply fuzzy logic in situations where labeling, classifying, and/or categorizing an input among a fixed set of mutually exclusive options is impossible or impractical. The aforementioned machine learning model 112 and techniques are discussed for exemplary purposes only and should not be construed as limiting one or more embodiments.

In an embodiment, as a machine learning engine 110 applies different inputs to a machine learning model 112, the corresponding outputs are not always accurate. As an example, the machine learning engine 110 may use supervised learning to train a machine learning model 112. After training the machine learning model 112, if a subsequent input is identical to an input that was included in labeled training data and the output is identical to the supervisory signal in the training data, then output is certain to be accurate. If an input is different from inputs that were included in labeled training data, then the machine learning engine 110 may generate a corresponding output that is inaccurate or of uncertain accuracy. In addition to producing a particular output for a given input, the machine learning engine 110 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In embodiments, the machine learning model may be used for anomaly detection. Three broad categories of anomaly detection techniques exist. Unsupervised anomaly detection techniques detect anomalies in an unlabeled test data set under the assumption that the majority of the instances in the data set are normal by looking for instances that seem to fit least to the remainder of the data set. Supervised anomaly detection techniques may provide, as training input, a first data set that has been labeled as "normal" and a second data set that has been labeled as "abnormal", and training a classifier using the first and second data sets to determine whether an unlabeled input should be labeled as "normal" or "abnormal." Semi-supervised anomaly detection techniques construct a model representing normal behavior from a given normal training data set, and then test the likelihood of a test instance to be generated by the model.

In an embodiment, the performance tuning engine 102 is configured to receive data from one or more external data sources 118. An external data source 118 refers to hardware and/or software operating independent of the performance tuning engine 102. For example, the hardware and/or software of the external data source 118 may be under control of a different entity (e.g., a different company or other kind of organization) than an entity that controls the query suggestion engine. An external data source 118 may supply data associated with one or more internet of things (IoT) devices.

In an embodiment, the performance tuning engine 102 is configured to retrieve data from an external data source 118 by 'pulling' the data via an application programming interface (API) of the external data source 118, using user credentials that a user has provided for that particular external data source 118. Alternatively or additionally, an external data source 118 may be configured to 'push' data to the performance tuning engine 102 via an API, using an access key, password, and/or other kind of credential that a user has supplied to the external data source 118. The performance tuning engine 102 may be configured to receive data from an external data source 118 in many different ways.

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as the performance tuning engine 102 and/or the external data source 118. Alternatively or additionally, a data repository 120 may be implemented or executed on a computing system separate from the performance tuning engine 102 and/or the external data source 118. A data repository 120 may be communicatively coupled to the performance tuning engine 102 and/or the external data source 118 via a direct connection or via a network. In some embodiments, the data repository 120 includes one or more data caches, allowing the system 100 to store data in a location that is persistent, but not permanent. Alternatively or additionally, the system 100 may use at least a portion of the one or more data caches included in the data repository 120 to store summary statistics related to the dataset.

The data repository can serve as a repository for many types of data. For example, the data stored in the data repository can represent data received from one or more IoT devices. The data can be categorized based on various criteria. The categorization can be selected to allow efficient, definable classification of data, and to provide for estimation of use cases. Without algorithmic classification, manual declaration by a user with expertise in the business space and the computing technology is required to optimize partitioning of data on disc, creation of indexes for efficient retrieval, and caching strategies. As a particular example, data can be categorized as one of Identifier Data 122, Usecase Data 124, or Runtime Data 126, as shown in FIG. 1. Identifier Data 122 may include data that identifies a particular device providing the data. Usecase Data 124 may include data associated with a particular function of the device providing the data. Runtime Data 126 may include data associated with activities performed by the device providing the data.

Identifier Data 122 can be human-readable and/or human-understandable characteristics of data. The Identifier Data 122 can include aspects such as device name, serial number, data of purchase, and similar characteristics. Identifier Data 122 can include many different identifiers of a device providing the data. Typically, Identifier Data 122 includes data that remains constant or changes very seldomly. The system can assume that Identifier Data 122 will have the lowest cardinality (e.g., the fewest distinct entries) in the system. The system may assume that Identifier Data 122 is typically a root level of grouping for many forms of reporting and predictive analysis. For example, a machine learning algorithm that predicts a chance of failure of a car based on miles driven may start off by grouping data by car make and model, then looking for trends within that make and/or model. From a storage/retrieval perspective, the system can assume that most interactions will be use an operator such as "equals" rather than a range operator. Because Identifier Data 122 is root level data, it has the fewer records that Usecase Data 124 or Runtime Data 126. Partitioning the dataset by any value in Identifier Data 122 may provide little benefit when reading, but will be of high value when analyzing the dataset. Caching the Identifier Data 122 is typically very efficient since it is rarely edited. Identifier Data 122 tends to include string values. Records are wide, but collections are not big; therefore, memory space can typically be saved by hashing the Identifier Data to a lookup table. When joining data across families, the Identifier Data 122 is typically the Right Hand Side of the join.

Usecase Data 124 is generally data referring to the various ways a device providing data is used. For example, for a thermostat, the Usecase Data 124 may comprise "heating" or "cooling." Like Identifier Data 122, Usecase Data 124 is typically represented as one or more strings. However, Usecase Data is typically not as amenable to hashing because each part of the Usecase record can be a significant feature. Additionally, analysis of the dataset may focus on drilling down within the Usecase Data 124. Therefore, Usecase Data 124 is often accessed in a variety of methods and at a variety of points in the analysis. Overall system performance can be improved by caching the Usecase Data 124 partitioned by each field in turn. While this caching procedure caches more data than a single partitioning, the cache is likely to be valuable. Further, because Usecase Data 124 has a relatively low row count, caching the Usecase Data is not prohibitively memory expensive. Because the system decides the Usecase Data 124 should be cached, storage of the Usecase Data on disc does not need to be particularly read-efficient. Rather, the storage can be space-efficient, aggressively compressing the Usecase Data 124.

Runtime Data 126 may include information about a particular instance of an Identifier Data as used in the field. For example, for a thermostat runtime data may comprise a temperature measurement and a timestamp indicating a time at which the temperature was recorded. The system may determine that Runtime Data 126 is the largest family of data, typically by orders of magnitude. The system may determine that at least one field in the Runtime Data 126 is a timestamp, and either requires that the timestamp be declared or looks for one in the data. Regardless of the size of the Runtime Data 126 when set up, the system may determine that the Runtime Data 126 will eventually grow to be too large for any form of in-memory data read. In a heterogeneous data environment like one with both a relational database and high-volume data storage, the Runtime Data 126 may be data that the system will determine should be stored in the high-volume data storage. Because the Runtime Data 126 is typically predicted to be so large and to include different reports (often many reports) from the same physical object (e.g., the device that is currently in operation), the system may determine that the Runtime Data 126 is typically accessed by either a time range scan (e.g., all records over the last week, month, or year) or by a time range scan combined with a partition key from Usecase Data 124 and/or Identifier Data 122 (e.g., all records of the past year grouped by thermostats in heating mode). The system may algorithmically optimize storage by determining that, based on record timestamp, older data can be moved to less efficient storage at a move rate based on a frequency declared by the analytic operations users have defined (e.g., users that run an analysis of data from the past week will not be as sensitive to slowness in reading 5 year old data as users who's analysis is defined by long-term trends).

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Improving System Performance Based on Data Characteristics

Figure 2:
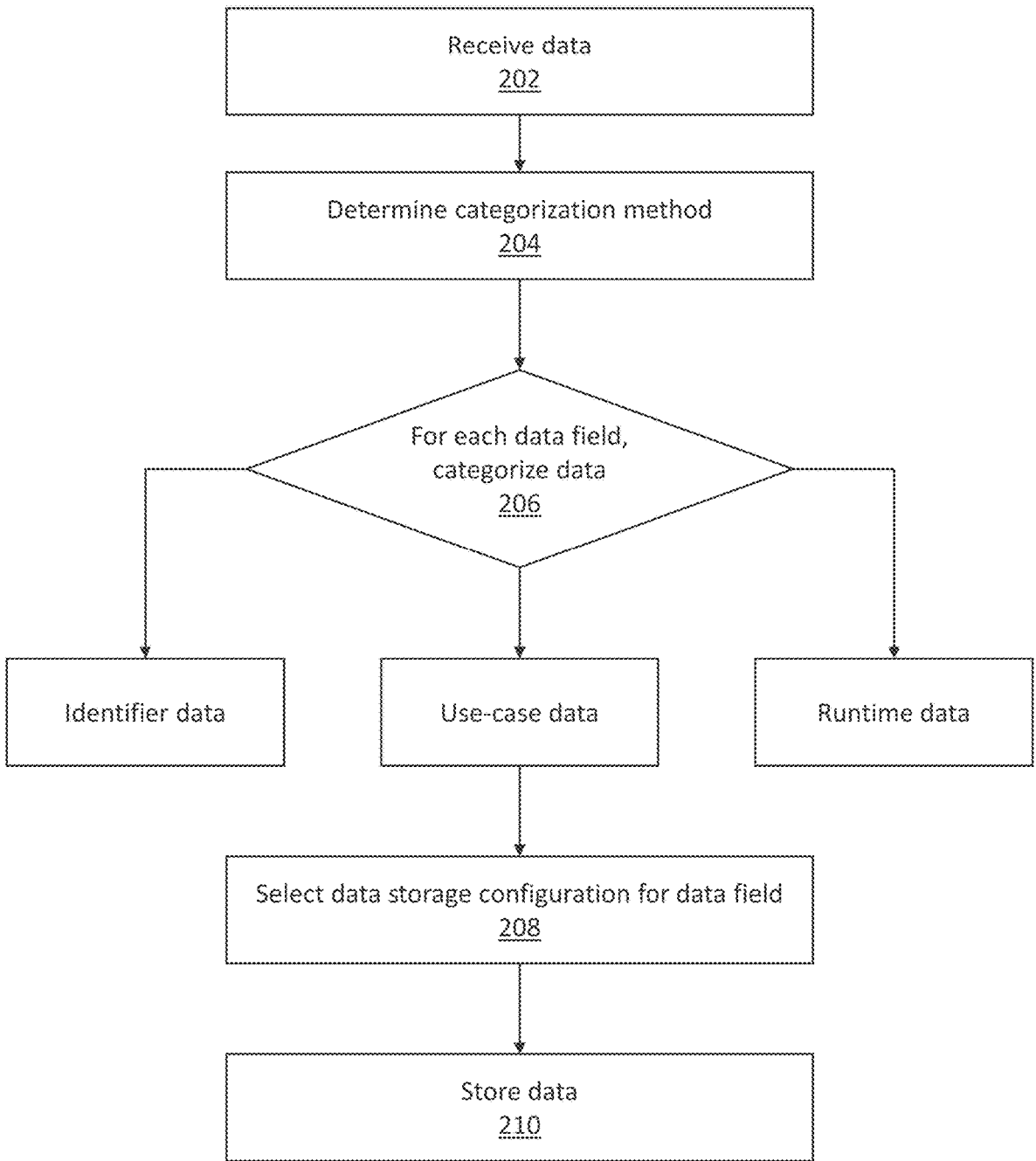
FIG. 2 illustrates an example set of operations for improving system performance based on data characteristics in accordance with one or more embodiments.

FIG. 2 illustrates an example set of operations for improving system performance based on data characteristics in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, a system (e.g., one or more components of system 100) receives a data set (Operation 202). In some embodiments, the data set can be received as a single unit. In other embodiments, the data set can be received over time (e.g., intermittently or periodically). In some aspects, the data can be received from one or more external devices. In particular, the data may be received from a connected device, such as an Internet of Things device. The Internet of Things (IoT) is a system of interrelated computing devices, mechanical and digital machines provided with unique identifiers and the ability to transfer data over a network without requiring human-to-human or human-to-computer interaction. IoT devices may include, for example, building or home automation devices, medical and/or health care devices, transportation devices (e.g., inter- and/or intra-vehicle communication, traffic control, logistics, vehicle safety and/or control), agricultural monitoring devices, and the like. Many kinds of devices can utilize IoT architecture.

The received data may include one or more data fields (also known as data sets). As an example, the received data may include, a timestamp, one or more identifiers identifying the device transmitting the data to the system, one or more data items indicating a mode of usage of the device, and one or more measurements performed by the device. In some aspects, each data item received at the system may include an entry in each of the data fields. In other aspects, a data item received at the system may include only those fields which have changed since a previous data item was received.

The system can determine a categorization method for data fields in the data set (Operation 204). The categorization method can be used for one or more of the data fields in the data set. In some embodiments, the same categorization method is used to categorize each data field in the data set. In other embodiments, different categorization methods can be used to categorize different data fields.

As an example, a data field can be assigned to a category based on frequency at which the data in that field is received or updated. For example, data can be categorized based on an absolute frequency at which data is received or updated (e.g., a number of items corresponding to a particular data field received or updated per second, per minute, or per hour). As another example, data can be assigned to a category based on a relative frequency (e.g., a number of items corresponding to a particular data field received or updated in comparison to other fields of the data set).

As another example, a data field can be assigned to a category based on a number of records in the data in that field. For example, data can be categorized based on an absolute number of records (e.g., a number of records corresponding to a particular data field being less than 100, less than 1000, etc.). As another example, data can be assigned to a category based on a relative number of records (e.g., a number of records corresponding to a particular data field in comparison to other fields of the data set).

Each field of the received data may be categorized based on the determined categorization method. (Operation 206). Categories to which the data fields may be assigned may include Identifier Data, Usecase Data, or Runtime Data. Identifier Data may include data that identifies a particular device providing the data. Usecase Data may include data associated with a particular function or mode of operation of the device providing the data. Runtime Data may include data associated with activities and/or measurements performed by the device providing the data.

In some embodiments, categorizing the data can include selecting a first threshold number and a second threshold number. The second threshold number can be greater than the first threshold number. In some embodiments, the threshold numbers can be selected based on the data contained in the data set. In other embodiments, the threshold numbers can be predetermined. In embodiments, the second threshold is orders of magnitude greater than the first threshold. The first and second threshold can be used to categorize the data fields.

As an example, data fields that do not exceed the first threshold may be categorized as Identifier Data. Identifier Data can be human-level characteristics of data. The Identifier Data can include aspects such as device name, serial number, data of purchase, and similar characteristics. Identifier Data can include many different identifiers of a device providing the data. Typically, Identifier Data includes data that remains constant or changes very seldomly. Accordingly, Identifier Data may have a relatively high cardinality (e.g., a relatively large number of distinct entries) in the system, but may be updated with the lowest frequency.

As another example, data fields that exceed the first threshold but do not exceed the second threshold may be categorized as Usecase Data. Usecase Data is generally data referring to the various ways a device providing data is used. For example, for a thermostat, the Usecase Data may comprise "heating" or "cooling." Typically, Usecase Data is changes relatively infrequently, but more often than Identifier data. Accordingly, Usecase Data has a relatively low cardinality. However, the cardinality of Usecase Data is greater than the cardinality of identifier data. Similarly, Usecase Data is updated with relatively low frequency, but is updated more frequently than Identifier Data.

As a third example, data fields that exceed both the first threshold and the second threshold may be categorized as Runtime Data. Runtime Data may include information about a particular instance of an Identifier Data as used in the field. For example, for a thermostat runtime data may comprise a temperature measurement and a timestamp indicating a time at which the temperature was recorded. The system may determine that Runtime Data is the largest family of data, typically by orders of magnitude. The system may determine that at least one field in the Runtime Data is a timestamp, and either requires that the timestamp be declared or looks for one in the data. Regardless of the size of the Runtime Data when set up, the system may determine that the Runtime Data will eventually grow to be too large for any form of in-memory data read.

The system may determine a storage configuration for storing the data fields based on the determined categorization (Operation 208). Configuring the storage may include selecting a storage medium to which the data field is to be stored. In embodiments, configuring the data further includes specifying a particular layout of the data within the selected storage medium. Configuring the storage may include selecting a particular data structure for use in storing the data field entries. Additionally, the storage configuration may specify a particular partitioning of a database to improve database performance.

In embodiments, the system can rely on a machine learning algorithm to track user input regarding analysis of the data set. For example, the system can track data access operations (e.g., join operations, table scan operations, read operations, and the like) caused by a user. The system can rely on machine learning for determining a pattern in the data access operations, and selecting a storage configuration based in part on the pattern. For example, when a vast majority of data access operations are for data received in the past week, the system can determine that data more than one week old can be stored in a more space efficient and less read-efficient way.

The storage configuration can be selected, for example, based in part on the size of the data field. The storage configuration may also be selected based on a way the data field is typically accessed. For example, the frequency with which the data is accessed, and the type of access performed can affect the selected configuration. The system may associate particular access types and frequencies with particular data categories, allowing the system to select particular storage configurations for data fields based on the categorization of the data field. In some embodiments, configuring the storage can comprise selecting a storage configuration from among a plurality of storage configurations. The plurality of storage configurations can be predetermined based on typical usage of one or more storage devices.

As a particular example, Identifier data is typically a root level of grouping for many forms of reporting and predictive analysis. From a storage/retrieval perspective, most interactions with Identifier Data may use an operator such as "equals" rather than a range operator. Identifier Data has the fewer records that Usecase Data or Runtime Data. Accordingly, partitioning the dataset by any value in Identifier Data may provide little benefit when reading, but will be of high value when analyzing the dataset. Caching the Identifier Data is typically very efficient since it is rarely edited. Identifier Data tends to include string values. Records are wide, but collections are not big; therefore, memory space can typically be saved by hashing the Identifier Data to a lookup table. When joining data across families, the Identifier Data is typically the Right-Hand Side of the join.

As another example, Usecase Data is typically represented as one or more strings. However, Usecase Data is typically not as amenable to hashing because each part of the Usecase record can be a significant feature. Additionally, analysis of the dataset may focus on drilling down within the Usecase Data. Therefore, Usecase Data is often accessed in a variety of methods and at a variety of points in the analysis. Overall system performance can be improved by caching the Usecase data partitioned by each field in turn. While this caching procedure caches more data than a single partitioning, the cache is likely to be valuable. Further, because Usecase Data has a relatively low row count, caching the Usecase Data is not prohibitively memory expensive. Because the system decides the Usecase Data should be cached, storage of the Usecase Data on disc does not need to be particularly read-efficient. Rather, the storage can be space-efficient, aggressively compressing the Usecase Data.

As another example, Runtime Data may be stored in high-volume data storage. Because the Runtime Data typically includes a large data set including different reports (often many reports) from the same physical object (e.g., the device that is currently in operation), the system may determine that the Runtime Data is typically accessed by either a time range scan (e.g., all records over the last week, month, or year) or by a time range scan combined with a partition key from Usecase Data or Identifier Data (e.g., all records of the past year grouped by thermostats in heating mode, all record of the past year grouped based on serial number). The system may algorithmically optimize storage by determining that, based on record timestamp, older data can be moved to less read-efficient storage at a move rate based on a frequency declared by the analytic operations users have defined (e.g., users that run an analysis of data from the past week will not be as sensitive to slowness in reading 5 year old data as users who's analysis is defined by long-term trends).

In some embodiments, following selection of a storage configuration, the system stores the data (Operation 210). Storing the data may include storing data to the selected storage device. Storing the data may include creating a data structure according to the selected storage configuration. In some embodiments, data storage may include selecting a new data configuration. For example, in response to one or more of a user access pattern change, a data inflow pattern change, or as discovered knowledge about those patterns grow, selecting a new storage configuration (and storing data based on the newly-selected storage configuration) is not only possible but likely.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
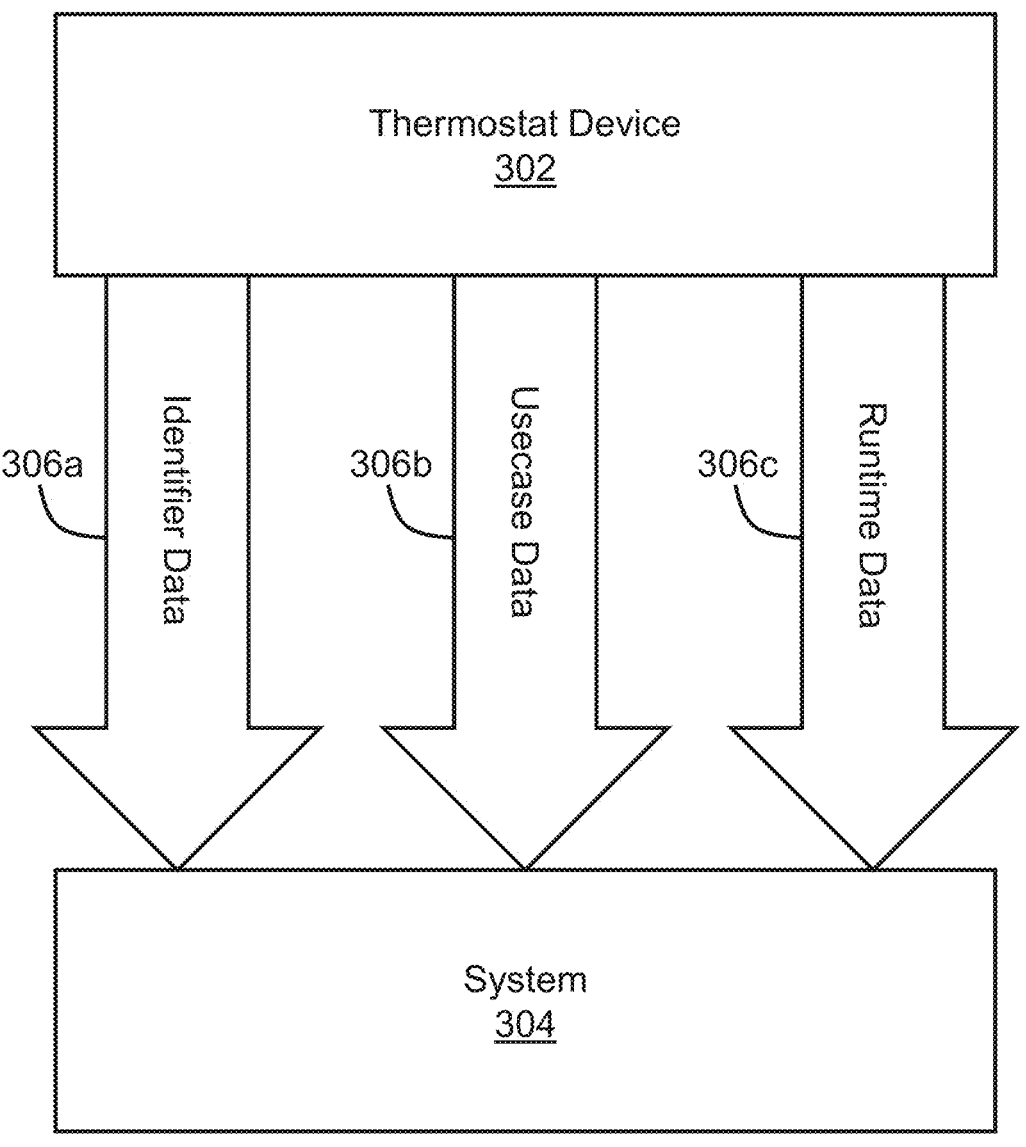

FIG. 3A shows a connected thermostat device 302 that transmits data to a system 304 for collection, as represented by arrows 306. In particular, device 302 may transmit Identifier Data 306a, Usecase Data 306b, and Runtime Data 306c. As shown in FIG. 3A, the thickness of the arrow corresponds to the relative number of updates to each of the data categories.

As shown in FIG. 3B, the data set includes a data field "Device Identifier," a data field "Device Mode," a data field "Temperature," and a timestamp. As shown in the "Timestamp" and "Temperature" data fields, the device 302 transmits a temperature measurement to the system 304 once per second. With each measurement, the device also transmits an identifier (e.g., the "Device Identifier" data field). Additionally, the device transmits an indicator of its operational mode (e.g., the "Device Mode" data field). In the example shown in FIG. 3B, the device "Device_01" transitions from a "Cooling" mode to a "Heating" mode at the time 12:00:00. The change in mode could indicate a user interaction to change the mode, a scheduled mode change, or other reason for mode transition.

The system categorizes each of the data fields as one of Identifier Data, Usecase Data, or Runtime Data. The system sets a first threshold at 1 and a second threshold at 5. The "Device Identifier" field includes 1 update, which does not exceed the first threshold or the second threshold. Accordingly, the "Device Identifier" data field is categorized as Identifier Data. The "Device Mode" field includes 2 updates, which exceeds the first threshold but does not exceed the second threshold. Accordingly, the "Device Mode" data field is categorized as Usecase Data. The "Temperature" and "Timestamp" fields each include 11 updates, which exceeds both the first threshold and the second threshold. Accordingly, the "Temperature" and "Timestamp" data fields are each categorized as Runtime Data.

Following the categorization, the system can determine a storage configuration for each category of data. For the Identifier Data (e.g., the "Device Identifier" data field), the system can select a storage configuration that is space-efficient, such as a heavily compressed storage configuration. The system can further recommend caching the Identifier Data for quick retrieval. For the Usecase Data (e.g., the "Device Mode" data field), the system can select a storage configuration that is space-efficient, such as a heavily compressed storage configuration. For the Runtime Data (e.g., the "Temperature" and "Timestamp" data fields), the system can recognize that these data fields are likely to grow quickly, and determine a storage configuration that allows for large volumes of data to be stored efficiently. Moreover, the system can structure the data storage in a way that leads to increased efficiency when reading the data. For example, the data can be stored chronologically, since it is likely that analysis of the data will result in retrieving data that spans a particular time range. The data from each field can be stored according to the selected storage configurations.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
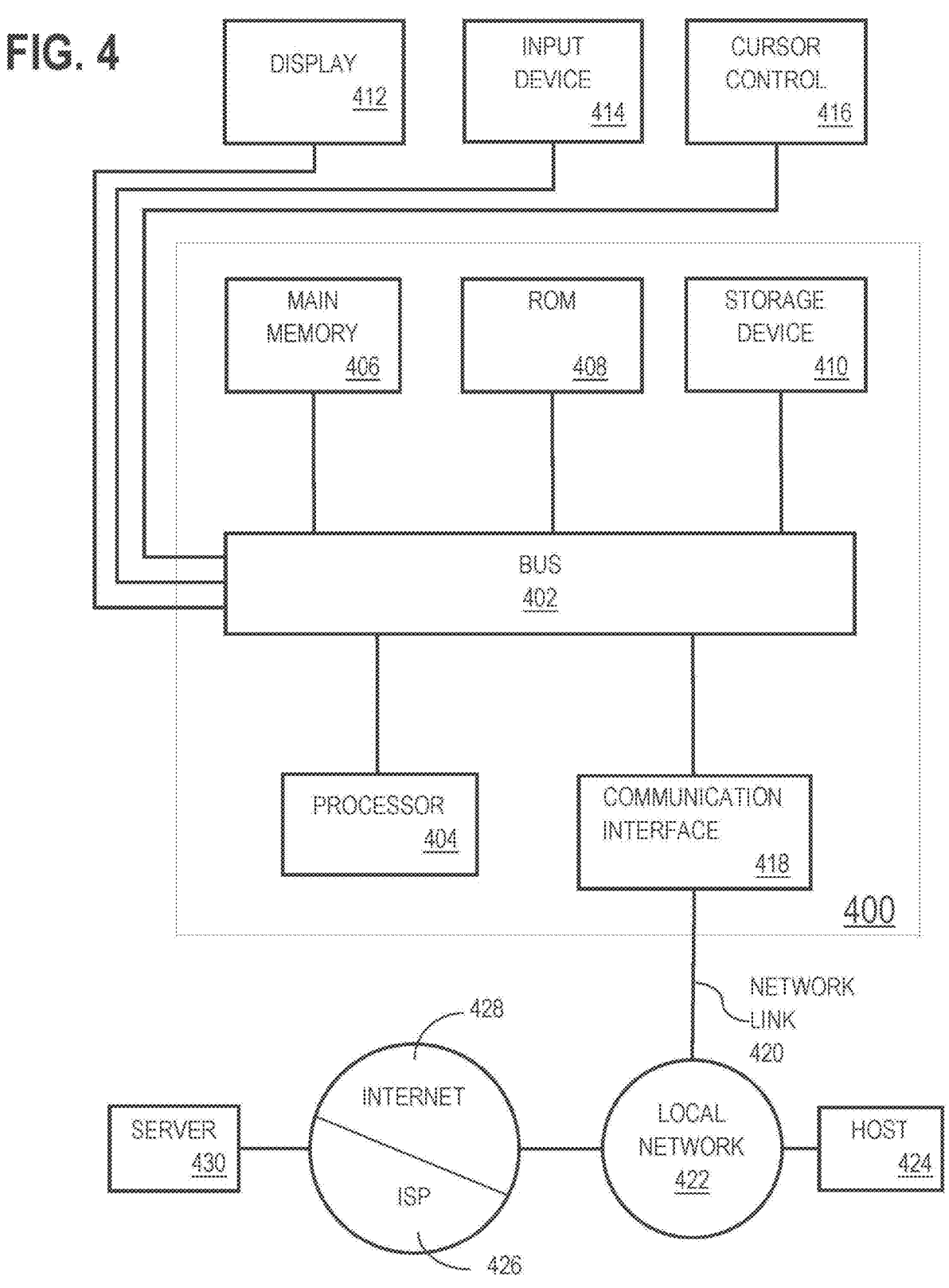
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause performance of operations comprising:

training a machine learning model to generate threshold data access frequency values for use in generating data storage configuration recommendations;

receiving a first target set of time-series data for a first time interval, the first target set of time-series data comprising:

a first plurality of time-series records, each record comprising:

a first field storing a first set of values across the first plurality of time-series records; and a second field storing a second set of values across the first plurality of time-series records;

a first set of access data specifying operations to access the first set of values during the first time interval; and a second set of access data specifying operations to access the second set of values during the first time interval;

determining a first data access frequency associated with the first set of values stored in the first field and representing a first frequency of data access operations accessing the first set of values stored in the first field across the first plurality of time-series records;

determining a second data access frequency associated with the second set of values stored in the second field and representing a second frequency of data access operations accessing the second set of values stored in the second field across the first plurality of time-series records;

applying the machine learning model to the first target set of time-series data to determine a first threshold frequency value for evaluation of the first data access frequency and the second data access frequency; and based at least on comparing the first data access frequency to the first threshold frequency value:

generating a first data storage configuration recommendation for storing the first set of values extracted from the first field according to a first data storage configuration;

based at least on comparing the second data access frequency to the first threshold frequency value:

generating a second data storage configuration recommendation for storing the second set of values according to a second data storage configuration, wherein the second data storage configuration recommendation differs from the first data storage configuration recommendation;

extracting the first set of values from the first field;

extracting the second set of values from the second field across the first plurality of time-series records;

storing the extracted first set of values according to the first data storage configuration; and storing the second set of values according to the second data storage configuration.

2. The one or more non-transitory machine-readable media of claim 1, wherein training the machine learning model comprises:

obtaining a training dataset comprising:

time-series data comprising fields storing values across sets of time-series records;

access data specifying operations to access the values stored in the fields; and labels specifying storage configurations for storing the values extracted from the fields; and training the machine learning model based on the training dataset.

3. The one or more non-transitory machine-readable media of claim 2, wherein the machine learning model predicts the first threshold frequency value and generates the first data storage configuration recommendation, wherein the machine learning model comprises an artificial neural network, wherein training the machine learning model based on the training dataset comprises training at least one intermediate layer of the artificial neural network to generate at least one output value corresponding to the first threshold frequency value based on receiving a set of input values corresponding to the first data access frequency to the at least one intermediate layer from neurons in a preceding layer, and wherein a subsequent layer of the artificial neural network is trained to receive the at least one output value from the at least one intermediate layer and generate the first data storage configuration recommendation based on the at least one output value.

4. The one or more non-transitory machine-readable media of claim 1, wherein the operations further comprise:

receiving a second target set of time-series data for a second time interval, the second target set of time-series data comprising:

a second plurality of time-series records, each record comprising a second field storing a second set of values across the second plurality of time-series records; and a second set of access data specifying operations to access the second set of values during the second time interval;

applying the machine learning model to the second target set of time-series data to determine a second threshold frequency value for evaluating a second data access frequency associated with the second set of access data, the applying comprising:

determining the second data access frequency associated with the second set of values stored in the second field;

determining, by the machine learning model, a second threshold frequency value different from the first threshold frequency value; and based at least on comparing the second data access frequency to the second threshold frequency value: generating the first data storage configuration recommendation for storing the second set of values;

extracting the second set of values from the second field across the second plurality of time-series records; and storing the second set of values according to the first data storage configuration.

5. The one or more non-transitory machine-readable media of claim 4, wherein the first data access frequency is less than the first threshold frequency value, wherein the second data access frequency is greater than the first threshold frequency value, and wherein the second data access frequency is less than the second threshold frequency value.

6. The one or more non-transitory machine-readable media of claim 1, wherein the machine learning model further determines a second threshold frequency value, and wherein the operations further comprise:

based on comparing the first data access frequency to the first threshold frequency value and the second threshold frequency value:

categorizing the first set of values as a first data type; and selecting the first data storage configuration for storing the first set of values based on mapping the first data type to the first data storage configuration;

based on comparing a second data access frequency associated with a second set of values in a second field in the first target set of time-series data to the first threshold frequency value and the second threshold frequency value:

categorizing the second set of values as a second data type; and selecting a second storage configuration for storing the second set of values based on mapping the second data type to the second storage configuration; and based on comparing a third data access frequency associated with a third set of values in a third field in the first target set of time-series data to the first threshold frequency value and the second threshold frequency value:

categorizing the third set of values as a third data type; and selecting a third storage configuration for storing the third set of values based on mapping the third data type to the third storage configuration.

7. The one or more non-transitory machine-readable media of claim 6, wherein the first data type is name data associated with a device name, wherein the second data type is use-case data describing an operating state of a device, and wherein the third data type is runtime data comprising measurements generated by the device.

8. The one or more non-transitory machine-readable media of claim 1, wherein the first data storage configuration comprises at least one of:

hashing values for a respective data field to a lookup table;

storing values for the first field and a second field in separate storage devices corresponding to different data retrieval speeds;

storing values for the first field and the second field in separate storage devices having different data storage capacities;

a particular data partitioning schema; and a compression rate for compressing data stored in the first field and the second field.

9. A method, comprising:

training a machine learning model to generate threshold data access frequency values for use in generating data storage configuration recommendations;

receiving a first target set of time-series data for a first time interval, the first target set of time-series data comprising:

a first plurality of time-series records, each record comprising:

a first field storing a first set of values across the first plurality of time-series records; and a second field storing a second set of values across the first plurality of time-series records;

a first set of access data specifying operations to access the first set of values during the first time interval; and a second set of access data specifying operations to access the second set of values during the first time interval;

determining a first data access frequency associated with the first set of values stored in the first field and representing a first frequency of data access operations accessing the first set of values stored in the first field across the first plurality of time-series records;

determining a second data access frequency associated with the second set of values stored in the second field and representing a second frequency of data access operations accessing the second set of values stored in the second field across the first plurality of time-series records;

applying the machine learning model to the first target set of time-series data to determine a first threshold frequency value for evaluation of the first data access frequency and the second data access frequency; and based at least on comparing the first data access frequency to the first threshold frequency value:

generating a first data storage configuration recommendation for storing the first set of values extracted from the first field according to a first data storage configuration;

based at least on comparing the second data access frequency to the first threshold frequency value:

generating a second data storage configuration recommendation for storing the second set of values according to a second data storage configuration, wherein the second data storage configuration recommendation differs from the first data storage configuration recommendation;

extracting the first set of values from the first field;

extracting the second set of values from the second field across the first plurality of time-series records;

storing the extracted first set of values according to the first data storage configuration; and storing the second set of values according to the second data storage configuration.

10. The method of claim 9, wherein training the machine learning model comprises:

obtaining a training dataset comprising:

time-series data comprising fields storing values across sets of time-series records;

access data specifying operations to access the values stored in the fields; and labels specifying storage configurations for storing the values extracted from the fields; and training the machine learning model based on the training dataset.

11. The method of claim 10, wherein the machine learning model predicts the first threshold frequency value and generates the first data storage configuration recommendation, wherein the machine learning model comprises an artificial neural network, wherein training the machine learning model based on the training dataset comprises training at least one intermediate layer of the artificial neural network to generate at least one output value corresponding to the first threshold frequency value based on receiving a set of input values corresponding to the first data access frequency to the at least one intermediate layer from neurons in a preceding layer, and wherein a subsequent layer of the artificial neural network is trained to receive the at least one output value from the at least one intermediate layer and generate the first data storage configuration recommendation based on the at least one output value.

12. The method of claim 9, further comprising:

receiving a second target set of time-series data for a second time interval, the second target set of time-series data comprising:

a second plurality of time-series records, each record comprising a second field storing a second set of values across the second plurality of time-series records; and a second set of access data specifying operations to access the second set of values during the second time interval;

applying the machine learning model to the second target set of time-series data to determine a second threshold frequency value for evaluating a second data access frequency associated with the second set of access data, the applying comprising:

determining the second data access frequency associated with the second set of values stored in the second field;

determining, by the machine learning model, a second threshold frequency value different from the first threshold frequency value; and based at least on comparing the second data access frequency to the second threshold frequency value:

generating the first data storage configuration recommendation for storing the second set of values;

extracting the second set of values from the second field across the second plurality of time-series records; and storing the second set of values according to the first data storage configuration.

13. The method of claim 12, wherein the first data access frequency is less than the first threshold frequency value, wherein the second data access frequency is greater than the first threshold frequency value, and wherein the second data access frequency is less than the second threshold frequency value.

14. The method of claim 9, wherein the machine learning model further determines a second threshold frequency value, and wherein the method further comprises:

based on comparing the first data access frequency to the first threshold frequency value and the second threshold frequency value:

categorizing the first set of values as a first data type; and selecting the first data storage configuration for storing the first set of values based on mapping the first data type to the first data storage configuration;

based on comparing a second data access frequency associated with a second set of values in a second field in the first target set of time-series data to the first threshold frequency value and the second threshold frequency value:

categorizing the second set of values as a second data type; and selecting a second storage configuration for storing the second set of values based on mapping the second data type to the second storage configuration; and based on comparing a third data access frequency associated with a third set of values in a third field in the first target set of time-series data to the first threshold frequency value and the second threshold frequency value:

categorizing the third set of values as a third data type; and selecting a third storage configuration for storing the third set of values based on mapping the third data type to the third storage configuration.

15. The method of claim 14, wherein the first data type is name data associated with a device name, wherein the second data type is use-case data describing an operating state of a device, and wherein the third data type is runtime data comprising measurements generated by the device.

16. The method of claim 9, wherein the first data storage configuration comprises at least one of:

hashing values for a respective data field to a lookup table;

storing values for the first field and a second field in separate storage devices corresponding to different data retrieval speeds;

storing values for the first field and the second field in separate storage devices having different data storage capacities;

a particular data partitioning schema; and a compression rate for compressing data stored in the first field and the second field.

17. A system comprising:

at least one device including a hardware processor;

the system being configured to perform operations comprising:

training a machine learning model to generate threshold data access frequency values for use in generating data storage configuration recommendations;

receiving a first target set of time-series data for a first time first time interval, the first target set of time-series data comprising:

a first plurality of time-series records, each record comprising:

a first field storing a first set of values across the first plurality of time-series records; and a second field storing a second set of values across the first plurality of time-series records;

a first set of access data specifying operations to access the first set of values during the first time interval; and a second set of access data specifying operations to access the second set of values during the first time interval;

determining a first data access frequency associated with the first set of values stored in the first field and representing a first frequency of data access operations accessing the first set of values stored in the first field across the first plurality of time-series records;

determining a second data access frequency associated with the second set of values stored in the second field and representing a second frequency of data access operations accessing the second set of values stored in the second field across the first plurality of time-series records;

applying the machine learning model to the first target set of time-series data to determine a first threshold frequency value for evaluation of the first data access frequency and the second data access frequency; and based at least on comparing the first data access frequency to the first threshold frequency value:

generating a first data storage configuration recommendation for storing the first set of values extracted from the first field according to a first data storage configuration;

based at least on comparing the second data access frequency to the first threshold frequency value:

generating a second data storage configuration recommendation for storing the second set of values according to a second data storage configuration, wherein the second data storage configuration recommendation differs from the first data storage configuration recommendation;

extracting the first set of values from the first field;

extracting the second set of values from the second field across the first plurality of time-series records;

storing the extracted first set of values according to the first data storage configuration; and storing the second set of values according to the second data storage configuration.

18. The system of claim 17, wherein the machine learning model predicts the first threshold frequency value and generates the first data storage configuration recommendation, wherein the machine learning model comprises an artificial neural network, wherein the machine learning model is trained based on a training dataset, wherein training the machine learning model based on the training dataset comprises training at least one intermediate layer of the artificial neural network to generate at least one output value corresponding to the first threshold frequency value based on receiving a set of input values corresponding to the first data access frequency to the at least one intermediate layer from neurons in a preceding layer, and wherein a subsequent layer of the artificial neural network is trained to receive the at least one output value from the at least one intermediate layer and generate the first data storage configuration recommendation based on the at least one output value.

* * * * *